United States Patent [19]  
Zdarsky et al.

[11] 3,975,204  
[45] Aug. 17, 1976

[54] METHOD OF POST-HARVEST TREATMENT OF SUGAR CANE

[75] Inventors: Josef Zdarsky; Jan Rehor; Rudolf Bretschneider, all of Prague, Czechoslovakia

[73] Assignee: Vysoka skola chemicko-technologicka, Prague, Czechoslovakia

[22] Filed: Apr. 30, 1975

[21] Appl. No.: 573,386

[30] Foreign Application Priority Data

May 8, 1974  Czechoslovakia ................. 3303-74

[52] U.S. Cl. ................................ 127/42; 21/60.5 A
[51] Int. Cl.² ........................ B01J 1/18; C13D 1/00
[58] Field of Search ....... 127/42; 21/60.5 R, 60.5 A; 427/4

[56] References Cited

UNITED STATES PATENTS

| | | | |
|---|---|---|---|
| 3,108,907 | 10/1963 | Cucullu | 127/42 X |
| 3,694,262 | 9/1972 | Casey | 127/41 X |
| 3,874,925 | 4/1975 | Loncin | 127/44 |

*Primary Examiner*—Morris O. Wolk
*Assistant Examiner*—Michael S. Marcus

[57] ABSTRACT

Method of sugar cane treatment between the harvesting and processing period. Sugar cane is contacted in such period with isothiocyanate, preferably allyl isothiocyanate at a ratio of one weight part of allyl isothiocyanate to 1,000 – 10,000,000 weight parts of sugar cane.

3 Claims, No Drawings

METHOD OF POST-HARVEST TREATMENT OF SUGAR CANE

This invention relates to a method of treating sugar cane between the harvesting and processing period.

Sugar cane, after being harvested, is not often processed immediately, but is usually stacked on fields and in transport vehicles for periods of days or even weeks. Consequently, losses in weight and sugar content occur due to processes of natural dissipation. With higher ambient temperatures and lower relative air humidities, the losses tend to be higher. The literature establishes that sugar cane stored for 13–15 days after harvest loses some 9–15% of its weight and 30–44% in weight of sugar. So far, the only way to prevent these losses has been the rational organization of harvesting operations, haulage and processing, which, however, is a hard task to achieve during the harvest campaign.

These disadvantages are eliminated by the new method of sugar cane treatment of the present invention. In accordance with such method, between harvesting and processing, sugar cane stems are contacted with isothiocyanate, preferably with allyl isothiocyanate (AITC) at a ratio of one weight part of the isothiocyanate to 1,000 up to 10,000,000 parts of sugar cane. Isothiocyanate is applied in the form of an emulsion at a concentration of 0.001 to 1 percent of the sugar cane stem weight. The sprinkling liquid can be in the form of aqueous emulsion, suspension, aqueous or solvent solution, or in the form of vapors in a carrier gas, e.g. air.

The advantage of this method of treating sugar cane is the possibility of preserving the technological qualities of sugar cane by a simple procedure, i.e. by sprinkling it with a low concentration solution of allyl isothiocyanate. Sugar cane treated in this manner preserves all of its technological qualities for a minimum of two weeks.

The effectiveness of allyl isothiocyanate in the method of the invention can even be increased, provided the sugar cane stems are covered up by a thin PVC foil. This enables the maintenance of a higher relative air humidity, which again favorably affects normal cell turgor, and moreover, makes sprinkling with an emulsion of higher concentration superfluous. In some cases there is brought about an increase of the stem weight due to the absorption of the water from the sprinkling process, and even a slight germination of roots and buds may set in. Thus, a large quantity of reducing agents and non-sugar compounds are used up due to this spouting. More extensive sprouting can be prevented by maintaining the relative air humidity at 70 to 75 percent, or by a one-time or a repeated sprinkling with a 1% emulsion of allyl isothiocyanate.

The emulsion or solution can be prepared by using an emulsifier, preferably sodium salts of octyl ester of sulpho-succinic acid ("Spolion 8"), at a ratio of 1 part of allyl isothiocyanate to 0.2 – 0.5 parts of the emulsifier. As a solvent of the allyl iosthiocyanate, it is possible to use ethanol, ether, amylalcohol, acetone and the like.

The invention is illustrated by the following examples of the method of the invention.

EXAMPLE 1

Sugar cane, harvested manually by machetes, was moved immediately after being harvested into roofed spaces without side walls for storage. Thus there was prevented any direct effect of sunlight and the storing temperature was reduced. In addition the influence of rainfall and dew were precluded by this arrangement. The sugar cane was divided into four equal parts and sprinkled three times daily with an emulsion of allyl isothiocyanate — one part was then treated with such emulsion with a concentration of 0.1% and covered up with a PVC foil. Two of the remaining parts were treated with allyl isothiocyanate emulsions of 0.1 and 0.01% concentrations, respectively, but remained uncovered. The fourth part was treated with 0.01% emulsion and covered by a PVC foil. The best results were recorded in that part having been treated with a 0.1% emulsion and covered up with a PVC foil.

The results are indicated in Table 1 which follows:

TABLE 1

RESULTS OF EXPERIMENT WITH STORAGE OF SUGAR CANE DESCRIBED IN EXAMPLE 1 - VALUES IN %

| | WEIGHT LOSSES OF SUGAR CANE | QUANTITY OF SOAK | DRY VALUE OF SOAK | SUCROSE OF SOAK | PURITY OF SUGAR CANE | SUCROSE OF SUGAR CANE | QUANTITY OF REDUCING SUGARS | WEIGHT LOSSES OF SUGAR* |
|---|---|---|---|---|---|---|---|---|
| AFTER HARVEST CONTROL | 0 | 56.91 | 22.46 | 20.12 | 89.58 | 13.51 | 0.31 | 0 |
| AFTER STORAGE CONTROL | 9.23 | 51.44 | 23.44 | 16.75 | 71.50 | 9.78 | 3.72 | 34.29 |
| AITC 0.1% | 5.97 | 56.39 | 23.42 | 20.08 | 86.12 | 13.22 | 1.12 | 7.99 |
| AITC 0.1% + PVC | + 7.44 | 56.11 | 21.67 | 19.13 | 88.25 | 12.75 | 0.58 | + 1.40 |
| AITC 0.01% | 4.69 | 57.24 | 24.29 | 19.67 | 84.46 | 12.70 | 1.33 | 10.40 |
| AITC 0.01% + PVC | 0 | 57.94 | 22.14 | 19.25 | 86.95 | 12.76 | 0.84 | 5.55 |

*Weight losses of sugar after harvesting were calculated according to the formula:

$$ZC = \frac{(VT_{pr} \cdot Pol_{pr}) - (VT_{po} \cdot Pol_{po})}{(VT_{pr} \cdot Pol_{pr})} \cdot 100$$

$ZC$ = weight losses of sugar in %
$VT_{pr}$ = weight of sugar cane after harvest in %
$VT_{po}$ = weight of sugar cane after storage in %
$Pol_{pr}$ = sucrose of sugar cane after harvest in %
$Pol_{po}$ = sucrose of sugar cane after storage in %

EXAMPLE 2

Sugar cane harvested manually and previously treated by fire so as to remove dry leaves, was stored and treated in the same way as indicated in Example 1. The lowest losses of sugar resulted in sugar cane treated with an emulsion of 0.1%.

The results are indicated in Table 2 which follows:

TABLE 2

RESULTS OF EXPERIMENT WITH STORAGE OF SUGAR CANE DESCRIBED IN EXAMPLE 2 - VALUES IN %

| | WEIGHT LOSSES OF SUGAR CANE | QUANTITY OF SOAK | DRY VALUE OF SOAK | SUCROSE OF SOAK | PURITY OF SUGAR CANE | SUCROSE OF SUGAR CANE | QUANTITY OF REDUCING SUGARS | WEIGHT LOSSES OF SUGAR* |
|---|---|---|---|---|---|---|---|---|
| AFTER HARVEST CONTROL | 0 | 52.10 | 21.28 | 18.91 | 88.89 | 12.59 | 0.41 | — |
| AFTER STORAGE CONTROL | 13.24 | 51.11 | 22.55 | 17.34 | 76.93 | 10.66 | 2.34 | 26.54 |
| AITC 0.1% | 3.51 | 50.21 | 21.83 | 18.52 | 84.41 | 12.05 | 0.86 | 7.65 |
| AITC 0.1% + PVC | +1.77 | 54.63 | 19.73 | 17.36 | 86.72 | 11.46 | 0.98 | 7.37 |
| AITC 0.01% | 7.08 | 51.40 | 22.04 | 17.87 | 81.22 | 11.36 | 2.28 | 16.16 |
| AITC 0.01% + PVC | 0 | 55.59 | 20.33 | 17.22 | 84.56 | 11.21 | 0.76 | 10.96 |

*See Example 1

EXAMPLE 3

Sugar cane harvested by harvester/cutting to 30–50 cm long pieces was stored and treated in the same way as indicated in Examples 1 and 2. The lowest losses of sugar resulted with sugar cane treated with a 0.1% emulsion and covered with a PVC foil.

The results are indicated in Table 3 which follows:

TABLE 3

RESULTS OF EXPERIMENT WITH STORAGE OF SUGAR CANE DESCRIBED IN EXAMPLE 3 - VALUES IN %

| | WEIGHT LOSSES OF SUGAR CANE | QUANTITY OF SOAK | DRY VALUE OF SOAK | SUCROSE OF SOAK | PURITY OF SUGAR CANE | SUCROSE OF SUGAR CANE | QUANTITY OF REDUCING SUGARS | WEIGHT LOSSES OF SUGAR* |
|---|---|---|---|---|---|---|---|---|
| AFTER HARVEST CONTROL | — | 58.97 | 22.28 | 19.97 | 89.93 | 13.42 | 0.35 | — |
| AFTER STORAGE CONTROL | 18.31 | 57.38 | 22.47 | 14.01 | 62.39 | 7.29 | 4.68 | 55.62 |
| AITC 0.1% | 6.76 | 65.15 | 20.77 | 17.32 | 83.36 | 11.18 | 1.10 | 22.32 |
| AITC 0.1% + PVC | 4.29 | 63.12 | 20.40 | 17.65 | 86.55 | 11.64 | 0.71 | 16.99 |
| AITC 0.01% | 9.46 | 64.40 | 21.36 | 16.49 | 77.23 | 10.16 | 2.21 | 31.45 |
| AITC 0.01% + PVC | 4.05 | 62.64 | 20.70 | 16.83 | 8.127 | 10.70 | 1.60 | 23.50 |

*See Example 1

The results of measurement show that sprinkling with a 0.1% solution of allyl isothiocyanate tends to be more effective than sprinkling with a 0.01% solution.

Sugar cane harvested manually and, especially, that processed by singeing, is best treated with a 0.1% emulsion of allyl isothiocyanate; sugar cane harvested mechanically and cut to short pieces requires a concentration of 0.2 to 0.5% of such emulsion so as to reduce sugar losses.

Although the invention is illustrated and described with reference to a plurality of preferred embodiments, it is to be expressly understood that it is in no way limited by the disclosure of such a plurality of embodiments, but is capable of numerous modifications within the scope of the appended claims.

What is claimed is:

1. A process of sugar cane treatment subsequent to harvesting and prior to processing of the sugar cane, consisting essentially of contacting the sugar cane stems with allyl isothiocyanate in the ratio of one weight part of allyl isothiocyanate to from 1,000 to 10,000 parts by weight of sugar cane stems.

2. The process as defined in claim 1, wherein said allyl isothiocyanate is in the form of an emulsion at a concentration of from 0.001 to 1.0 percent by weight.

3. The process as defined in claim 1, wherein said allyl isothiocyanate is in the form of an emulsion at a concentration of 0.1 percent by weight.

* * * * *